United States Patent [19]
Reiter et al.

[11] Patent Number: 5,557,499
[45] Date of Patent: Sep. 17, 1996

[54] HARD-DISK DRIVE TRAY ASSEMBLY WITH PIVOTALLY ROTATABLE FRONT BEZEL

[75] Inventors: Victor R. Reiter, Huntington Beach; Bao G. Le, Orange, both of Calif.

[73] Assignee: AST Research, Inc., Irvine, Calif.

[21] Appl. No.: 268,010

[22] Filed: Jun. 28, 1994

[51] Int. Cl.⁶ .................................... H05K 5/00; H05K 7/16
[52] U.S. Cl. ........................ 361/685; 361/725; 312/223.2
[58] Field of Search ................................ 361/685, 725, 361/726, 727; 312/223.2, 332.1, 333

[56] References Cited

U.S. PATENT DOCUMENTS

| | | |
|---|---|---|
| 2,514,246 | 7/1950 | Knox . |
| 4,550,362 | 10/1985 | Reimer . |
| 4,742,608 | 5/1988 | M'Sadoques et al. . |
| 4,858,070 | 8/1989 | Buron et al. ............................. 361/695 |
| 4,896,777 | 1/1990 | Lewis . |
| 4,941,841 | 7/1990 | Darden et al. ........................... 361/685 |
| 4,954,928 | 9/1990 | Jullien .................................... 361/684 |
| 4,979,909 | 12/1990 | Andrews . |
| 5,003,431 | 3/1991 | Imsdahl . |
| 5,187,643 | 2/1993 | I-Shou . |
| 5,229,919 | 7/1993 | Chen ....................................... 361/685 |
| 5,277,615 | 1/1994 | Hastings et al. ........................ 439/377 |

Primary Examiner—Leo P. Picard
Assistant Examiner—Phuong T. Vu
Attorney, Agent, or Firm—Lyon & Lyon

[57] ABSTRACT

A hard-disk drive tray assembly includes an adapter, a tray, and a bezel. The adapter and tray are designed with slots and protrusions such that the adapter can be secured to the tray without the use of tools, screws, or nuts. The bezel pivots horizontally about the tray and comprises at least one incorporated inserter/extractor lever thereby allowing a user to insert and extract the hard-disk drive tray assembly using just one hand. The bezel has a built-in handle which allows a user to securely grasp onto the hard-disk drive tray assembly during transportation from one location to another. Furthermore, the bezel comprises a translucent or transparent LED display window for providing an external means of visually monitoring the typical LED status indication light which is integral to the hard-disk drive without having to run additional wiring from the hard-disk drive to an externally mounted LED light.

9 Claims, 3 Drawing Sheets

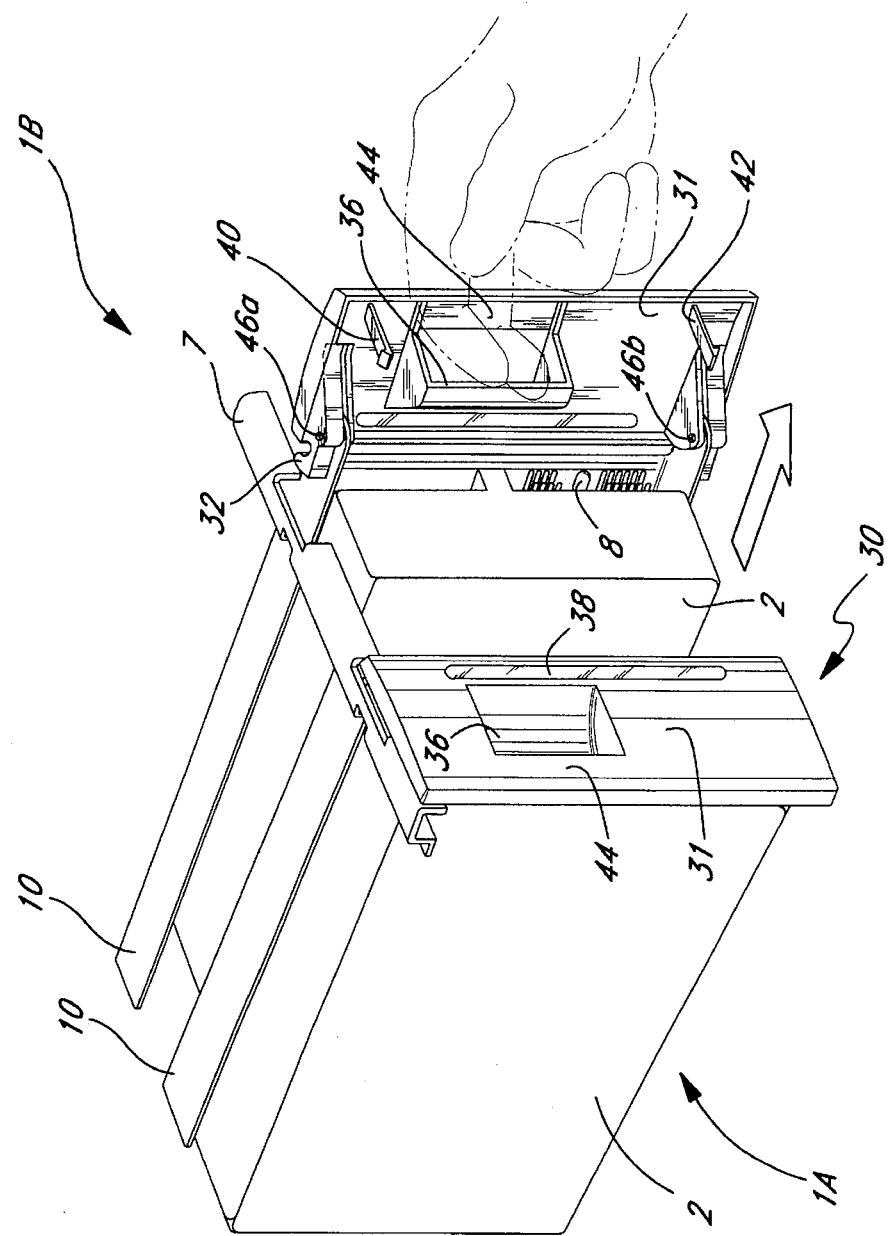
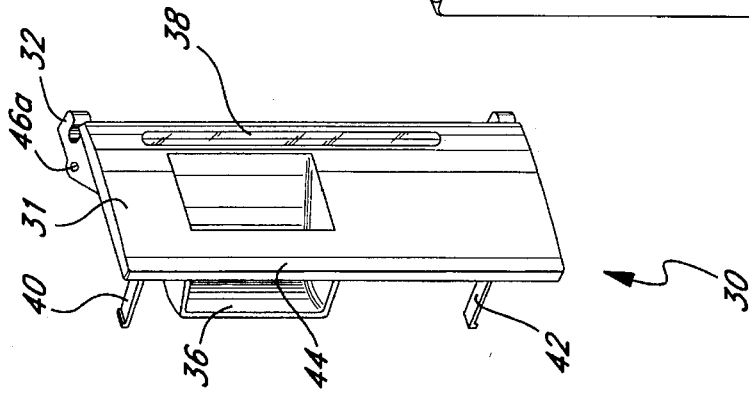

HARD-DISK DRIVE TRAY ASSEMBLY WITH PIVOTALLY ROTATABLE FRONT BEZEL

FIELD OF THE INVENTION

This invention relates to removable hard-disk drives, and more specifically to an improved hard-disk drive tray assembly.

BACKGROUND OF THE INVENTION

Although more and more desktop and portable computer systems are offering removable hard-disk drives as an option, removable hard-disk drives are more commonly available on computer network file servers.

Removable hard-disk drives provide a quick and simple way of adding, removing, or replacing a hard-disk drive in a computer system. For example, to increase the amount of hard-disk space available on the file server, one can either add another removable hard-disk drive to an empty hard-disk drive slot, or replace a smaller hard-disk drive with a larger hard-disk drive. This process typically takes only a few seconds.

With a standard hard-disk drive, one has to open up a computer chassis by removing a computer chassis cover, and then attach a new hard-disk drive via cables and screws to an available hard-disk drive slot. If replacing a smaller hard-disk drive, one would have to detach the cables and dismount the smaller hard-disk drive before replacing it with a larger hard-disk drive in a similar manner. While not a very difficult process, it can still take a few minutes to complete depending upon the location and configuration of the computer system.

However, the real benefits of a removable hard-disk drive come with the convenience of adding, removing, or replacing a hard-disk drive on an as-needed basis, rather than the benefit derived from a few minutes of saved time every time the amount of hard-disk space needs to be increased on the computer system.

By allowing for the quick and simple removal and installation of a hard-disk drive, it becomes practical for a company to remove and secure sensitive data to protect it when no one is around. Furthermore, removable hard-disk drives allow a person to transport large amounts of data from one computer system to another in a matter of seconds, rather than the time consuming process of downloading data to the other computer system via cable connection.

When a removable hard-disk drive malfunctions, a properly functioning hard-disk drive can be "hot swapped" with the defective hard-disk drive in a matter of seconds, without having to power down the computer system. With a standard hard-disk drive, it is advisable to power down the computer system before opening up the computer chassis to remove the defective standard hard-disk drive.

A removable hard-disk drive is typically mounted onto a tray assembly, which acts as an interface between a standard configuration third party hard-disk drive and a proprietary or custom designed computer manufacturer's chassis slot, which is a slot designed for receiving a hard-disk drive and hard-disk drive tray assembly.

A typical hard-disk drive tray assembly comprises a tray, an adapter, and may further include either pull handles or inserter/extractor levers which can be attached to the tray or incorporated into a front panel of the tray which is also known as a bezel.

The adapter comprises a pair of cables for connection to the hard-disk drive, and a connector for insertion into the hard-disk drive connector interface in the computer system. The adapter typically screws onto the tray, and a standard third party hard-disk drive is mounted to the tray as well. The cables from the adapter are connected to the hard-disk drive. The hard-disk drive, adapter, and tray can be inserted into, and extracted from, the computer chassis slot through the use of one or more pull handles or inserter/extractor levers attached to the tray, as discussed in greater detail below.

In another prior art embodiment, a pair of inserter/extractor levers are incorporated into a front panel which is pivotally attached to the tray in a vertical plane, like a pivoting car garage door on a house.

In order to properly insert a removable hard-disk drive into the computer chassis slot, the connector of the adapter must be firmly inserted into the corresponding hard-disk drive connector interface in the computer system, and the proper extraction requires the removal of the connector from the hard-disk drive connector interface. To ensure that the connector of the adapter is properly inserted into the hard-disk drive connector interface, the inserter/extractor lever of the prior embodiment provides a latch-and-pull mechanism that latches onto a latch bar, and then pulls the connector, along with the rest of the hard-disk drive tray assembly, into the hard-disk drive connector interface via a pivoting leverage action about the latch bar such that when the lever reaches a closed position, the connector has been properly and firmly inserted into the hard-disk drive connector interface.

Extraction of the hard-disk drive is the same as insertion, but in reverse. The inserter/extractor lever of the prior embodiment is rotated to an open position. In doing so, the lever, which is latched onto the latch bar, will engage in an opposite pivoting leverage action which will push on the latch bar so as to push away from the computer chassis slot thereby extracting the connector from the hard-disk drive connector interface.

The typical prior art embodiment of a hard-disk drive tray assembly, as described above, has some drawbacks in its operation.

First, most removable hard-disk drives with inserter/extractor levers have two levers which usually require two hands to operate the two levers simultaneously in order to insert or extract the hard-disk drive. Each lever is in an open position when the hard-disk drive tray assembly is inserted into the computer chassis slot up to the point where the connector has reached the hard-disk drive connector interface but has not yet been firmly inserted into the hard-disk drive connector interface. Each lever is pivoted into a closed position in order to latch and pull the connector, along with the rest of the hard-disk drive tray assembly, into the computer chassis slot such that the connector is firmly inserted into the hard-disk drive connector interface.

If only one hand were used to insert such a hard-disk drive tray assembly, one lever would remain opened while the other lever was being closed, or vice versa, and this would cause one end of the tray assembly to be further inserted or extracted than the other end. This uneven insertion causes the hard-disk drive tray assembly to twist slightly within the computer chassis slot such that the other lever will lock-up and be more difficult to move. In an embodiment with two levers, the hard-disk drive tray assembly should be inserted or extracted in an even manner to avoid such problem.

In other words, the two levers should both be pivoted into the open or closed position at the same time. That way, both ends of the hard-disk drive tray assembly will move into or out of the computer chassis slot at the same time, thereby avoiding any twisting motion which could cause one end to lock up. However, pivoting both levers on such an embodiment at the same time is difficult for a person to do with just one hand. Thus, such an embodiment typically requires a two-handed insertion or extraction.

Furthermore, some prior art implementations of the inserter/extractor levers have a locking feature so that a lever cannot be pivoted to the open position unless the lever is unlocked first. This method makes it even more difficult to insert or remove a hard-disk drive tray assembly using just one hand. In addition, such a design is not intuitive to a new user, and it is possible that a new or unfamiliar user of the computer system will attempt to pull the levers out into the open position without unlocking the levers. If the person thinks that the levers are stuck and pulls hard enough, the levers could break before actually releasing.

Second, once the adapter connector of the hard-disk drive tray assembly is extracted from the hard-disk drive connector interface, there is no structure for a person to securely grasp onto when transporting the hard-disk drive tray assembly. For example, the levers that are used to extract the hard-disk drive tray assembly are too small to grasp onto, and the hard-disk drive mounted to the tray is too bulky to grasp securely. This lack of a structure to provide secure handling of the hard-disk drive tray assembly increases the possibility of accidentally dropping the hard-disk drive tray assembly during transportation from one location to another.

Third, the prior art uses a front panel or bezel that operates on a vertical hinge in a pivoting manner similar to a car garage door on a house. The problem with this vertically pivoting design is that it is difficult to insert and extract the hard-disk drive tray assembly with just one hand, since grasping onto the vertically pivoting bezel will cause the hard-disk drive mounted onto the tray to swing down. To insert this embodiment also requires two hands. One hand is required to hold onto the bezel. The other hand must pivot the hard-disk drive and tray upward so that the hard-disk drive tray assembly can be inserted into the computer chassis slot.

Furthermore, with both inserter/extractor levers incorporated into the bezel on the upper pivoting edge, a twisting problem could occur in that uneven forces would be applied to the upper and lower portions of the hard-disk drive tray assembly, thereby causing the improper insertion of the connector into the hard-disk drive slot.

Fourth, in certain prior art implementations, additional wires are used to connect the hard-disk drive to LED status indicator lights which are mounted on the exterior of the computer chassis such that an LED status indication light would be visible to a computer user. However, this additional wiring adds manufacturing time and cost to the hard-disk drive tray assembly.

Furthermore, the custom integration of the additional wiring with externally mounted LED lights makes such an implementation of the hard-disk drive tray assembly proprietary to the computer manufacturer. This limits the options available to the end-user in that the end-user cannot go out and purchase a standard hard-disk drive at the best market price and install it onto the hard-disk drive tray assembly. Instead, the end-user will have to order the hard-disk drive mounted onto the hard-disk drive tray assembly from the particular manufacturer.

Other embodiments which do not provide the additional wiring provide the computer user no visual indication as to the status of the hard-disk drive. The user has to remove the front cover or the main cover of the computer chassis in order to see the hard-disk drive LED lights which are integral to the hard-disk drive unit itself.

Finally, in the prior art, the adapter is attached to the tray by inserting screws into holes on the adapter and tray, and then tightening these screws to secure the adapter to the tray. This small step adds time and cost to the manufacturing process due to the necessary use of a tool and the necessary use of screws and/or nuts.

Therefore, a better solution is needed to provide an improved hard-disk drive tray assembly that provides solutions to the above mentioned drawbacks which exist in the hard-disk drive tray assemblies of the prior art.

SUMMARY OF THE INVENTION

The improved hard-disk drive tray assembly of the present invention attempts to provide solutions to the drawbacks that exist in the prior art hard-disk drive tray assemblies.

The hard-disk drive tray assembly of the present invention comprises an adapter, a tray and a bezel. The hard-disk drive tray assembly implements a cleverly designed bezel which serves multiple purposes. The tray and adapter are also designed to overcome drawbacks which exist in the prior art.

First, the bezel of the improved hard-disk drive tray assembly of the present invention enables single-handed operation, which provides additional convenience over an embodiment which requires two hands for the insertion and extraction of the hard-disk drive tray assembly.

A pair of inserter/extractor levers are incorporated into the bezel design at upper and lower ends of a pivoting edge of the bezel. Since the bezel has the inserter/extractor levers incorporated into the bezel design itself, pivoting the bezel into the open or closed position will pivot both the upper and lower levers into the open or closed position at the same time. This will prevent the uneven insertion or extraction of the hard-disk drive tray assembly, thereby mitigating the problems associated with the twisting of the hard-disk drive tray assembly in the computer chassis slot. In addition, the design of the bezel suggests an intuitive method of operation to a new or unfamiliar user since the bezel is designed with the front surface having a recess and handle which suggests the proper placement of the hand on the bezel.

Second, the bezel is designed to provide a structure for allowing a user to securely grasp onto the hard-disk drive tray assembly when transporting it from one location to another. The bezel front surface has a recess which provides a place for one or more fingers to be placed, and the recess defines a handle along an edge of the bezel opposite the pivoting edge. By curling the fingers placed in the recess around the handle, and wrapping the thumb around the outer edge of the handle, the user is able to securely grasp onto the hard-disk drive tray assembly. This structural design reduces the possibility of mishandling or dropping the hard-disk drive tray assembly during transportation from one location to another.

Third, the bezel is designed to pivot horizontally about either the left edge or the right edge in a manner similar to the motion of a driver's seat car door or a passenger's seat car door respectively. In a preferred embodiment, the bezel rotates or pivots in a horizontal direction about the right edge, like the passenger's seat car door, since this configuration is preferable for the majority of people who are right-handed.

Furthermore, in this horizontally pivoting configuration, grasping the bezel handle will not cause the hard-disk drive and tray to swing down since the pivoting plane is horizontal and not vertical. The tray will remain in a position which allows for the hard-disk drive tray assembly to be properly inserted into the computer chassis slot. Unlike the vertically pivoting bezel of the prior art, the horizontally pivoting configuration of the present invention enables the user to insert and extract the hard-disk drive tray assembly with the use of just one hand.

Fourth, many of the various third party hard-disk drive manufacturers provide hard-disk drives with LED status indication lights that are integral to the hard-disk drive unit itself. Therefore, the improved hard-disk drive tray assembly of the present invention takes advantage of that feature and, rather than connecting additional wires from the hard-disk drive unit to externally mounted LED status indication lights as in the prior art, the present invention provides a translucent or transparent window on the bezel in a location whereby a computer user will be able to externally view the LED status indicator lights integral to the hard-disk drive unit itself without any additional wiring, and without having to open up the computer chassis. This feature provides the user with the benefits of an LED status indicator light, yet also provides the manufacturer with lower costs.

Moreover, this feature also provides end-users with the additional benefit of increased flexibility in choosing their hard-disk drive supplier. By designing the hard-disk drive tray assembly for a particular computer system, the end user of that particular computer system can easily purchase any standard third party manufacturer hard-disk drive and mount it to the tray of the present invention and install the hard-disk drive tray assembly into the computer system. The end-user does not have to rely on the computer manufacturer as the sole source of additional hard-disk drives which come custom wired to external LED status indicator lights.

Finally, the tray and the adapter of the present invention are designed to eliminate the time consuming and costly process of attaching the adapter to the tray via tools, screws, and/or nuts. The tray has been designed with a pair of tabs and a pair of protrusions, and the adapter has been designed with a pair of corresponding slots for receiving the protrusions. Rather than requiring the use of tools, screws, and/or nuts, the adapter can be snapped securely to the tray without the use of any tools or extra parts in a matter of seconds, thereby reducing the time and cost of such assembly.

As a tray attachment edge of the adapter is inserted toward the tabs on the tray, the protrusions cause the adapter to be raised off the surface of the tray. When the tray attachment edge of the adapter reaches the tabs, the slots in the adapter will be positioned over the protrusions such that the protrusions will snap through the slots and abut against the slot such that the adapter cannot be removed from the tray without raising the adapter slots above the protrusion which requires a significant amount of effort.

Accordingly, it is an object of the present invention to provide an improved hard-disk drive tray assembly.

It is a further object of the present invention to provide an improved hard-disk drive tray assembly that allows a user to insert and extract the hard-disk drive tray assembly using just one hand.

An additional object of the present invention is to provide an improved hard-disk drive tray assembly that provides a structure which allows for a user to grasp securely onto the hard-disk drive tray assembly.

Another object of the present invention is to provide an improved hard-disk drive tray assembly that provides a horizontally pivoting bezel which enables the use of just one hand to insert and extract the hard-disk drive tray assembly.

Yet another object of the present invention is to provide an improved hard-disk drive tray assembly that allows for the attachment of the adapter to the tray without the use of tools, screws, or nuts.

Further objects and advantages of the present invention will become apparent from a consideration of the drawings and ensuing description.

BRIEF DESCRIPTION OF THE DRAWINGS

FIG. 3 is a perspective view of a preferred embodiment of a hard-disk drive tray assembly bezel.

FIG. 4 is a perspective view of the preferred embodiment of two hard-disk drive tray assemblies with hard-disk drives mounted to the trays. One hard-disk drive tray assembly with hard-disk drive is shown fully inserted into a computer chassis slot, and the other hard-disk drive tray assembly with hard-disk drive is shown partially extracted from another computer chassis slot.

A PRIOR ART DEVICE

Figure 1:
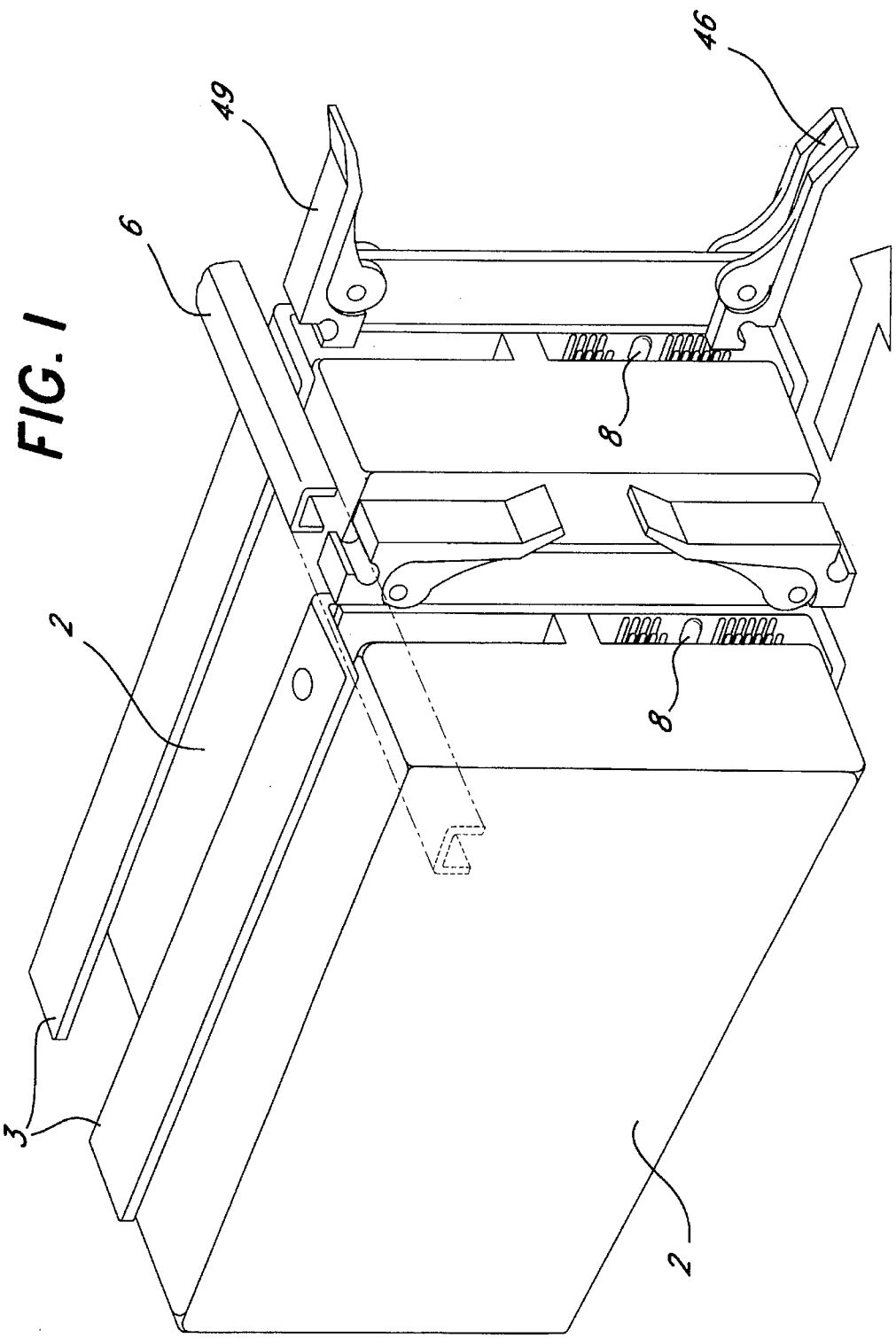
FIG. 1 is a perspective view of a prior art embodiment of a hard-disk drive tray assembly with a hard-disk drive mounted to the tray.

FIG. 1 illustrates a typical prior art embodiment of a hard-disk drive tray assembly having two hard disk drive trays and a hard disk drive associated with each tray. A hard-disk drive 2 is mounted to each tray 3. Each tray has a first inserter/extractor lever 4a and a second inserter/extractor lever 4b attached to the tray 3. The hard-disk drives 2 have an integral hard-disk drive LED light 8. The hard-disk drive tray assembly is shown being latched onto a latch bar 6 by the levers 4a and 4b. An adapter, which is typically an element of a hard-disk drive tray assembly, is not shown in this illustration.

DESCRIPTION OF THE PREFERRED EMBODIMENT

Figure 2:
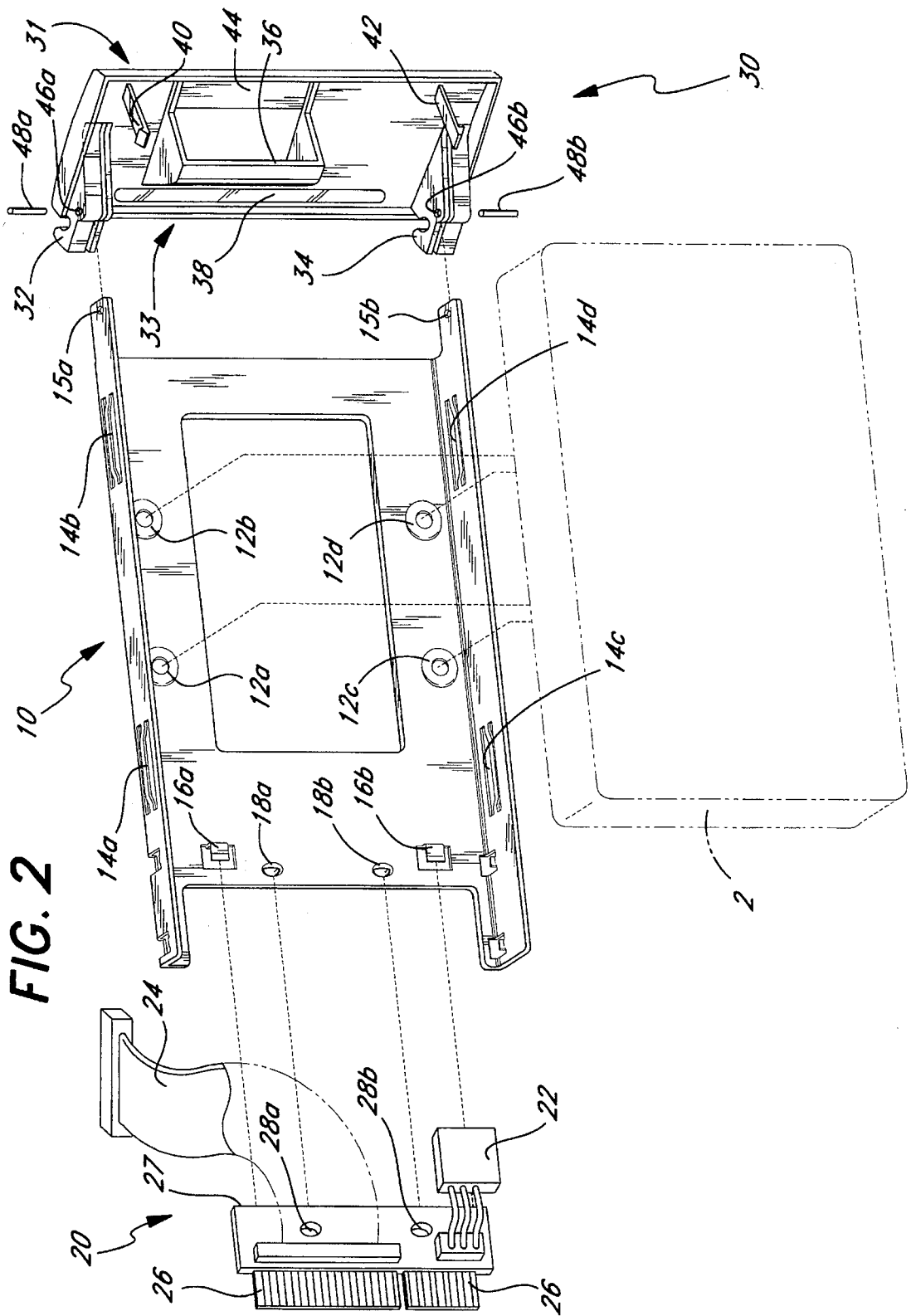
FIG. 2 is an exploded view of a preferred embodiment of a hard-disk drive tray assembly.

FIG. 2 illustrates a preferred embodiment of an improved hard-disk drive tray assembly 1 comprising a tray 10, an adapter 20, and a bezel 30. The tray 10 comprises a plurality of hard-disk drive mounting holes 12a, 12b, 12c, and 12d for mounting a hard-disk drive 2 to the tray 10, and a plurality of grounding edges 14a, 14b, 14c, and 14d, for grounding the tray 10 to a computer chassis (not shown). The tray 10 further comprises a pair of tabs 16a and 16b, and a pair of protrusions 18a and 18b, for securely receiving the adapter 20 as previously discussed. The tray has a pair of tray pivot holes 15a and 15b for pivotally attaching the bezel 30 to the tray 20.

The adapter 20 comprises a first cable 22 and a second cable 24 for connection to the hard-disk drive 2. A first edge of the adapter 20 comprises a connector 26, and the opposite edge provides a tray attachment edge 27. The adapter 20 further comprises a pair of slots 28a and 28b for receiving and abutting against the protrusions 18a and 18b when the adapter 20 is properly secured to the tray 10 in the proper manner.

The bezel 30, as shown in FIGS. 2–4, comprises a front surface 31, a first incorporated inserter/extractor lever 32 along a pivoting edge 33 a second incorporated inserter/ extractor lever 34 along the pivoting edge 33 a first detent 40, and a second detent 42. The front surface 31 has a recess 36 for allowing the placement of one or more fingers. The recess 36 and the edge of the front surface 31 opposite the pivoting edge 33 define a handle 44. The front surface 31 further comprises a translucent or transparent LED display window 38 for externally displaying to a user the status of the hard-disk drive 2 through the use of the integral hard-disk drive LED light 8. The upper and lower portions of the pivoting edge 33 of the bezel 30 comprise a pair of bezel pivot joints 46a and 46b for pivotally attaching the bezel 30 to the tray pivot holes 15a and 15b via a pair of pivot pins 48a and 48b.

Some of the benefits offered by the hard-disk drive tray assembly of the present invention even before it is inserted into a computer system will be discussed first and a discussion of the operation will follow. First, the tray 10 and adapter 20 are adopted to save time and money during the assembly process. Second, the hard-disk drive tray assembly 1 allows an end-user to purchase a standard hard-disk drive 2 and mount the hard-disk drive 2 onto the improved hard-disk drive tray assembly 1 for use with their computer system.

In a preferred configuration, a computer manufacturer provides the end-user with one or more improved hard-disk drive tray assemblies 1 each assembly comprising a tray 10, a adapter 20, and a bezel 30.

As is shown in FIG. 4, the hard-disk drive tray assembly 1 is usually proprietary or custom designed to fit into a latch bar configuration 7 specific to the computer chassis (not shown) of the computer manufacturer.

The tray 10 and adapter 20 are designed to save the computer manufacturer time and money during the assembly process. As described earlier, the tray 10 has a pair of tabs 16a and 16b, and a pair of protrusions 18a and 18b. The adapter 20 has a pair of corresponding slots 28a and 28b for receiving the protrusions 18a and 18b.

The tabs 16a and 16b are designed to exert a downward force on the adapter 20 toward the tray 10 when the tray attachment edge 27 of the adapter 20 is being inserted into the tabs 16a and 16b. The protrusions 18a and 18b protrude from the surface of the tray 10, thereby exerting an upward force on the adapter 20 away from the surface of the tray 10.

When the tray attachment edge 27 is fully inserted into the tabs 16a and 16b, the slots 28a and 28b in the adapter 20 will line up over the protrusions 18a and 18b of the tray 10 such that the protrusions 18a and 18b will snap through the slots 28a and 28b. Since the tabs 18a and 18b are exerting a downward force on the adapter 20, the adapter can not be pulled out of the tabs 18a and 18b in a horizontal direction due to the protrusions 18a and 18b which act as abutments against the slots 28a and 28b.

Thus, the adapter 20 can only be removed by lifting the adapter 20 slots 28a and 28b high enough off of the tray 20 so as to clear the protrusions 18a and 18b, despite having the tray attachment edge 27 still inserted into the tabs 16a and 16b.

In addition to the adapter 20 being snapped securely onto the tray 10, the bezel 30 is pivotally connected to the tray 10 in a horizontal configuration by inserting the bezel pivot pins 48a and 48b through the corresponding bezel pivot joints 46a and 46b and the tray pivot holes 15a and 15b.

Once the hard-disk drive tray assembly 1 is assembled as such, the improved hard-disk drive tray assembly 1 is ready for shipment either as an individual item or with a computer system. The hard-disk drive tray assembly 1 can be shipped with a hard-disk drive 2 pre-mounted to the hard-disk drive tray assembly 1, or it can be shipped without a hard-disk drive 2.

If the hard-disk drive tray assembly 1 is shipped without a hard-disk drive 2, the end-user has the freedom to shop the best price for the hard-disk drive 2, since any standard hard-disk drive 2 can be easily mounted to the hard-disk drive tray assembly 1 in the following manner. The hard-disk drive 2 is mounted to the tray 10 via the hard-disk drive mounting holes 12a, 12b, 12c, and 12d. The first cable 22 and the second cable 24 are connected to their corresponding slots (not shown) located on the hard-disk drive 2.

Operation of the Hard-Disk Drive Tray Assembly

In FIG. 4 a perspective view is shown of one hard-disk drive tray assembly 1A pully inserted into a computer chassis slot (the computer chassis slot is merely a space wherein a hard-disk drive can be properly inserted, and thus no structural element shown in FIG. 4 is labeled as the computer chassis slot) and of another hard-disk drive tray assembly 1B partially extracted from its corresponding computer chassis slot.

To insert the hard-disk drive tray assembly 1, with or without the hard-disk drive 2 installed, the user securely grasps the handle 44 of the bezel 30 by inserting one or more fingers into the recess 36, curling his or her fingers around the handle 44, and grasping the outer edge of the handle 44 with his or her thumb. The hard-disk drive tray assembly 1 is then positioned into the proper insertion position requiring the use of only one hand. The connector 26 portion of the adapter 20 is the first part of the hard-disk drive tray assembly 1 to be inserted into the computer chassis slot for receiving the hard-disk drive tray assembly 1.

The hard-disk drive tray assembly 1 is then slid all the way into the computer chassis slot along a computer chassis slot rail (not shown) until the connector 26 comes into contact with the hard-disk drive connector interface (not shown) at which time the snug fitting hard-disk drive connector interface provides a resistance to the further progress of the connector 26. When the hard-disk drive tray assembly 1 reaches this position within the computer chassis slot, the first and second levers 32 and 34 of the bezel 30 are pivoted from an open position to a closed position by pivoting the bezel 30. In the open position, with the connector 26 in contact with the connector interface, the levers 32 and 34 are in a position to latch onto the latch bar 7 shown in FIG. 4, wherein the pivoting of the bezel 30 to the closed position will move the first and second incorporated inserter/extractor levers 32 and 34 into the closed position simultaneously. The levers 32 and 34 then provide a latch and pull pivoting leverage action which pulls the hard-disk drive tray assembly 1 further into the computer chassis slot such that the connector 26 is firmly inserted into the hard-disk drive connector interface.

Once properly inserted, the status of the hard-disk drive 2 can be visually monitored externally by viewing the integral hard-disk drive LED light 8 through the translucent or transparent LED display window 38 located on the front surface 31 of the bezel 30.

To extract the hard-disk drive tray assembly 1, with or without a hard-disk drive 2 installed, the reverse steps are taken. By pulling on the handle 44 of the bezel 30, the levers 32 and 34 are pivoted back to the open position wherein the levers 32 and 34 provide a reverse latch and pull pivoting leverage action that releases and pushes against the latch bar 7 so as to extract the connector 26 from the hard-disk drive connector interface, thereby allowing for the easy removal of the hard-disk drive tray assembly 1 from the computer chassis slot.

Once the hard-disk drive tray assembly 1 is removed from the computer chassis slot, the hard-disk drive tray assembly 1 can be safely transported by grasping onto the handle 44 of the bezel 30, as described above.

While the above description contains many specificities, these should not be construed as limitations on the scope of the invention, but rather as an exemplification of one preferred embodiment thereof. Many other variations are possible.

For example, variations can be incorporated into a hard-disk drive tray assembly so as to implement the inventive features of the present invention into another configuration of a hard-disk drive tray assembly that will work on another computer manufacturer's proprietary or custom designed latch bars and computer chassis slots.

Furthermore, it should be noted that while the above embodiment describes a tray assembly for a hard-disk drive, the basic concept can be applied to various computer components which can be inserted and extracted in a simple manner by designing a tray assembly to accommodate such computer components.

What is claimed is:

1. A tray assembly comprising an adapter, a tray, and a bezel, the adapter and the tray comprising cooperating elements for securing said adapter to said tray by hand, the bezel attached to the tray to enable pivoting of said bezel around a line lying in a vertical plane, the bezel comprising a pair of inserter/extractor levers for providing a latch and pull action to facilitate even insertion of the tray assembly without the tray assembly twisting, and for providing a release and push action to facilitate even extraction of the tray assembly without the tray assembly twisting.

2. The tray assembly of claim 1 wherein the pair of inserter/extractor levers comprise a first inserter/extractor lever situated proximate an upper portion of a pivoting edge of said bezel and a second inserter/extractor lever situated proximate a lower portion of the pivoting edge of said bezel.

3. The tray assembly of claim 1 wherein the bezel further comprises a handle enabling secure handling of said tray assembly during transportation.

4. The tray assembly of claim 1 wherein the bezel further comprises a window through which may be viewed an LED light integral to a hard-disk drive which is attached to the tray assembly.

5. A bezel for a tray assembly comprising a pivot edge pivotally connectable to a tray via a pair of inserter/extractor levers enabling pivoting of the bezel around a line lying in a vertical plane, and the pair of inserter/extractor levers situated proximate the pivot edge for providing a latch and pull action to facilitate even insertion of the tray assembly without the tray assembly twisting, and for providing a release and push action to facilitate even extraction of the tray assembly without the tray assembly twisting.

6. The bezel of claim 5 wherein the pair of inserter/extractor levers comprise a first inserter/extractor lever situated proximate an upper portion of the pivoting edge of said bezel and a second inserter/extractor lever situated proximate a lower portion of the pivoting edge of said bezel.

7. The bezel of claim 5 further comprising a window through which may be viewed an LED light integral to a component which is attached to the tray assembly.

8. The bezel of claim 5 further comprising a front surface having a recess thereon to enable insertion of one or more finger therein, and an edge which, in conjunction with the recess, provides a handle to enable secure handling of said tray assembly.

9. A tray assembly comprising an adapter, a tray, and a bezel, the adapter and the tray comprising cooperating elements for securing said adapter to said tray by hand, the bezel comprising a pivot edge pivotally connectable to via a pair of inserter/extractor levers enabling pivoting of the bezel around a line lying in a vertical plane, and with the first inserter/extractor lever situated proximate an upper portion of the pivot edge and the second inserter/extractor lever situated proximate a lower portion of the pivot edge, the inserter/extractor levers for providing a latch and pull action to facilitate even insertion of the tray assembly without the tray assembly twisting, and for providing a release and push action to facilitate even extraction of the tray assembly without the tray assembly twisting, and the bezel further comprising a front surface having a recess thereon to enable insertion of one or more finger therein, and an edge which, in conjunction with the recess, provides a handle to enable secure handling of said tray assembly, and a window through which may be viewed an LED light integral to a component which is attached to the tray assembly.

* * * * *

UNITED STATES PATENT AND TRADEMARK OFFICE
CERTIFICATE OF CORRECTION

PATENT NO. : 5,557,499

DATED : September 17, 1996

INVENTOR(S) : Victor R. Reiter and Bao Gia Le

It is certified that error appears in the above-indentified patent and that said Letters Patent is hereby corrected as shown below:

Column 2, line 65, delete "problem" and insert -- problems-- therefore;

Column 4, line 45, delete "the front" and insert --a front-- therefore;

Column 8, line 18, delete "pully" and insert --fully-- therefore;

Col. 10, Claim 8, line 22, delete "finger" and insert --fingers-- therefore;

Col. 10, Claim 9, line 31, after the words "connectable to" insert --the tray--;

Col. 10, Claim 9, line 44, delete "finger" and insert -- fingers-- therefore.

Signed and Sealed this

Seventh Day of January, 1997

Attest:

BRUCE LEHMAN

Attesting Officer

Commissioner of Patents and Trademarks